(12) United States Patent
Gervasi et al.

(10) Patent No.: US 9,080,078 B2
(45) Date of Patent: *Jul. 14, 2015

(54) FUNCTIONAL SURFACES COMPRISED OF HYPER NANOCOMPOSITE (HNC) FOR MARKING SUBSYSTEM APPLICATIONS

(75) Inventors: David J. Gervasi, Pittsford, NY (US); Santokh Badesha, Pittsford, NY (US); Alan R. Kuntz, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,750

(22) Filed: Oct. 22, 2009

(65) Prior Publication Data

US 2011/0097588 A1    Apr. 28, 2011

(51) Int. Cl.
*C08L 83/00*  (2006.01)
*C08F 283/00* (2006.01)
*C08G 77/00*  (2006.01)
(Continued)

(52) U.S. Cl.
CPC ........... *C09D 201/005* (2013.01); *B41J 2/0057* (2013.01); *B41J 2/17593* (2013.01); *C09D 7/1225* (2013.01); *C09D 7/1266* (2013.01); *C09D 7/1275* (2013.01); *C08G 77/16* (2013.01); *C08K 3/04* (2013.01); *C08K 3/14* (2013.01); *C08K 3/22* (2013.01); *C08K 3/28* (2013.01); *C08K 3/34* (2013.01); *C08K 3/36* (2013.01); *C08K 9/06* (2013.01)

(58) Field of Classification Search
CPC .......... B82Y 30/00; B82Y 5/00; B82Y 40/00; C08K 3/08

USPC ......... 977/753, 779, 778, 734, 742, 750, 752, 977/754, 773; 525/100, 101, 474; 528/10, 528/33; 428/402, 411.1, 421; 524/1, 495, 524/496
See application file for complete search history.

(56) References Cited

U.S. PATENT DOCUMENTS 5,547,759 A   8/1996   Chen et al.
6,384,172 B1  5/2002   Dvornic et al.
(Continued)

FOREIGN PATENT DOCUMENTS

JP    08311205    11/1996
JP    11194640    7/1999
(Continued)

OTHER PUBLICATIONS

Qi et al., "CNT Reinforced PTFE/Elastomer Composites to Enable Long Life, Oil-Less Fusers", U.S. Appl. No. 12/245,850, filed Oct. 6, 2008.
(Continued)

*Primary Examiner* — Matthew Matzek
(74) *Attorney, Agent, or Firm* — MH2 Technology Law Group LLP

(57) ABSTRACT

Provided are hyper nanocomposite, hyper nanocomposite coatings, devices, and articles including s hyper nanocomposite coatings. An article can include a surface including at least one region and a hyper nanocomposite coating disposed over the one region, wherein the hyper nanocomposite coating can include a plurality of nanoparticles substantially uniformly dispersed in one or more cross-linked hyperbranched polymers selected from the group consisting of polycarbosilane, polycarbosilicane, and polycarbosilazene, polyfluorocarbon.

16 Claims, 4 Drawing Sheets

(51) Int. Cl.
*C08K 3/04* (2006.01)
*C09D 201/00* (2006.01)
*B41J 2/005* (2006.01)
*B41J 2/175* (2006.01)
*C09D 7/12* (2006.01)
*C08G 77/16* (2006.01)
*C08K 3/14* (2006.01)
*C08K 3/22* (2006.01)
*C08K 3/28* (2006.01)
*C08K 3/34* (2006.01)
*C08K 3/36* (2006.01)
*C08K 9/06* (2006.01)

(56) References Cited

U.S. PATENT DOCUMENTS

| | | |
|---|---|---|
| 6,646,089 B2 | 11/2003 | Dvornic et al. |
| 6,664,336 B1 | 12/2003 | Tomihashi et al. |
| 6,667,360 B1 * | 12/2003 | Ng et al. .................... 524/492 |
| 6,923,533 B2 | 8/2005 | Pan et al. |
| 6,995,215 B2 | 2/2006 | Dvornic et al. |
| 7,205,513 B2 | 4/2007 | Pan et al. |
| 8,193,294 B2 | 6/2012 | Hu et al. |
| 2003/0018130 A1 * | 1/2003 | Dvornic et al. .................... 525/101 |
| 2003/0212234 A1 * | 11/2003 | Dvornic et al. .................... 528/33 |
| 2006/0167139 A1 * | 7/2006 | Nelson et al. .................... 523/212 |
| 2006/0292360 A1 | 12/2006 | Hays et al. |
| 2007/0181855 A1 | 8/2007 | Nagao et al. |
| 2008/0070041 A1 | 3/2008 | Kuntz et al. |
| 2010/0086787 A1 | 4/2010 | Qi et al. |
| 2011/0012074 A1 * | 1/2011 | Sarkar et al. .................... 252/586 |

FOREIGN PATENT DOCUMENTS

| | | |
|---|---|---|
| JP | 2003201406 | 7/2003 |
| JP | 2000235282 | 8/2008 |
| WO | 2005014708 A1 | 2/2005 |

OTHER PUBLICATIONS

Qi et al., "CNT/Fluoropolymer Coating Composition", U.S. Appl. No. 12/198,460, filed Aug. 26, 2008.

* cited by examiner

FUNCTIONAL SURFACES COMPRISED OF HYPER NANOCOMPOSITE (HNC) FOR MARKING SUBSYSTEM APPLICATIONS

DETAILED DESCRIPTION

1. Field of Use

The present teachings relate generally to marking subsystems and, more particularly, to functional surfaces including hyper nanocomposites.

2. Background

Various marking subsystems are continually in need of improved functional surface coatings that provide tunable properties with respect to surface energy, release, conformability, appropriate thermal or electrical conductivity and wear performance, all while maintaining consistent performance over all of the aforementioned properties for as long as possible. Since the performance of a marking subsystem can be dependent upon various functional surface coatings, there is an ongoing need for new materials for coatings with improved physical, chemical, mechanical, and thermal properties.

Thus, there is a need to overcome these and other problems of the prior art and to provide improved functional surface coatings.

SUMMARY

In accordance with various embodiments, there is a hyper nanocomposite including a matrix. The matrix including one or more cross-linkable hyperbranched polymers selected from the group consisting of polycarbosilane, polycarbosiloxane, polycarbosilazane, and polyfluorocarbon and a plurality of nanoparticles substantially uniformly dispersed in the matrix.

According to various embodiments, there is an article including a surface, wherein the surface can include at least one region. The article can also include a hyper nanocomposite coating disposed over the one region, wherein the hyper nanocomposite coating can include a plurality of nanoparticles substantially uniformly dispersed in one or more cross-linked hyperbranched polymers selected from the group consisting of polycarbosilane, polycarbosiloxane, polycarbosilazane, and polyfluorocarbon.

According to another embodiment, there is an apparatus for forming an image including a charging station for uniformly charging a surface of an image receiving member, an imaging station for forming a latent image on the surface of the image receiving member, and a developing station for converting the latent image to a visible image on the surface of the image receiving member. The apparatus can also include a transfer subsystem positioned between the image receiving member and a transfer roller for transferring the developed image from the image receiving member to a media and a fuser subsystem for fixing the visible image onto the media, wherein at least one of the charging station, the imaging station, the development subsystem, the transfer subsystem, and the fuser subsystem can include a hyper nanocomposite coating disposed over a substrate, the hyper nanocomposite coating comprising a plurality of nanoparticles substantially uniformly dispersed in one or more cross-linked hyperbranched polymers selected from the group consisting of polycarbosilane, polycarbosiloxane, polycarbosilazane, and polyfluorocarbon.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

In the following description, reference is made to the accompanying drawings that form a part thereof, and which are shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1A:
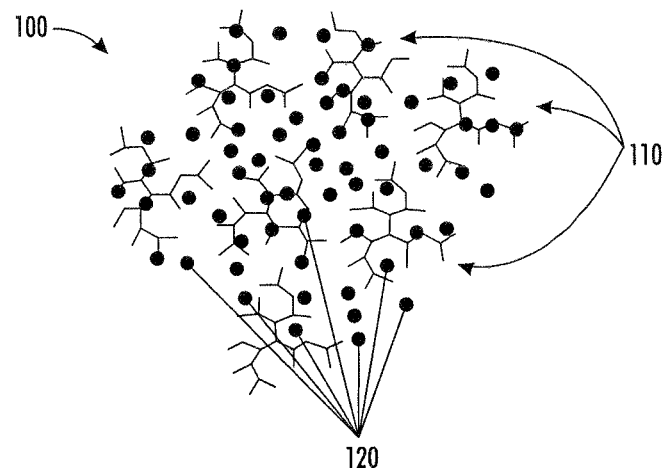
FIG. 1A shows a schematic illustration of an exemplary hyper nanocomposite in accordance with various embodiments of the present teachings.
Figure 1B:
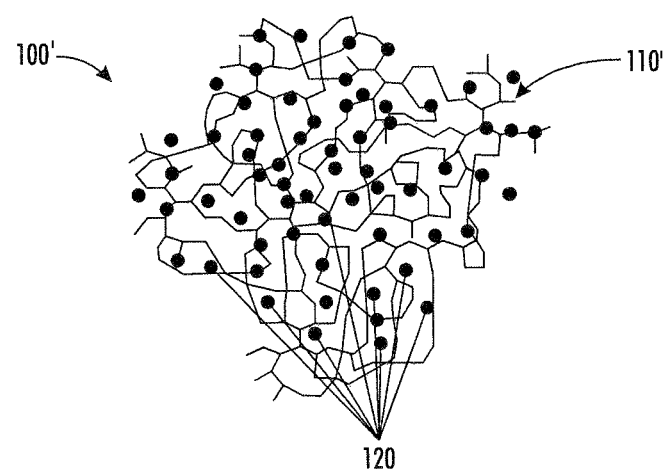
FIG. 1B shows a schematic illustration of another exemplary hyper nanocomposite in accordance with various embodiments of the present teachings.

FIG. 1A schematically illustrates an exemplary hyper nanocomposite (HNC) 100 in accordance with various embodiments of the present teachings. The hyper nanocomposite 100 can include a matrix including one or more cross linkable hyperbranched polymers 110 and a plurality of nanoparticles 120 substantially uniformly dispersed in the one or more cross linkable hyperbranched polymers 110. Any suitable cross linkable hyperbranched polymer can be used, including, but not limited to, polycarbosilane, polycarbosiloxane, and polycarbosilazane, polyfluorocarbon, and copolymers thereof. FIG. 1B schematically illustrates another exemplary hyper nanocomposite (HNC) 100' including a plurality of nanoparticles 120 substantially uniformly dispersed in one or more crosslinked hyperbranched polymers 110'. The cross linkable hyperbranched polymers 110 can be crosslinked using any suitable technique, including, but not limited to, thermal curing, uv curing, e-beam curing, and oxidative curing.

Hyperbranched polymers are macromolecules with a tree-like structure containing more branching than typical linear or branched polymers. Traditional branched polymers have a linear chain with primary or secondary branches attached to a linear polymer chain. The branching in a hyperbranched polymer is intermediate between pure dendrimers and traditional branched polymers. The polymerization for these types of hyperbranched polymers is a straightforward Ax+By polymerization, which has advantages in monomer availability, wide range of terminal end group choice and improved control over the reaction. U.S. Pat. Nos. 6,384,172; 6,646,089; 6,812,298; and 6,995,215 discloses in detail synthesis of a variety of hyperbranched polymers, the disclosures of which are incorporated by reference herein in their entirety.

In some embodiments, the plurality of nanoparticles 120 can be physically or chemically bonded to the one or more cross linked hyperbranched polymers 110. In other embodiments, the plurality of nanoparticles 120 can be physically compounded with the one or more cross linkable hyperbranched polymers before cross linking the hyperbranched polymers. In various embodiments, the plurality of nanoparticles 120 can be present in an amount ranging from about 0.5% to about 50% by weight of the total solid weight of the hyper nanocomposite 100 composition, or from about 3% to about 30%, or from about 3% to about 15%. Each of the plurality of nanoparticles can have at least one dimension in the range of about 1 nm to about 500 nm, and in some cases in the range of about 2 nm to about 100 nm, and in other cases in the range of about 5 nm to about 50 nm. In various embodiments, the plurality of nanoparticles 120 can include one or more of a plurality of nanoparticles, a plurality of nanotubes, and a plurality of nanoplatelets. Exemplary nanoparticles 120 can include, but are not limited to, graphene, carbon, aluminum oxide, aluminum nitride, silicon dioxide, silicon carbide, silicon nitride, copper, single wall carbon nanotubes, and multi-wall carbon nanotubes.

The disclosed hyper nanocomposites (HNC) 100 have improved physical, chemical, thermal, and/or electrical properties at temperatures in the range of about 70° C. to about 300° C. as compared to conventional linear or branched polymers. In general, hyperbranched polymers are well-known for having improved mechanical, rheological, and processing properties. Further addition of nanoparticles 120 to the cross linkable hyperbranched polymers 110 can provide additional manipulation of the physical, electrical, thermal, and/or release properties of the resulting hyper nanocomposite 100. For example, nanoparticles, such as, carbon nanotubes, graphene, and carbon can impart their electrical conductivity to the hyper nanocomposite 100. Therefore, the hyper nanocomposite 100 besides being mechanically strong, can be electrically conductive and can dissipate any electrostatic charges. Furthermore, carbon nanotubes, graphene, carbon, aluminum nitride, aluminum oxide, or boron nitride can increase the thermal conductivity of the hyper nanocomposite 100. In various embodiments, the hyper nanocomposite 100 can have a thermal conductivity in the range of about 0.1 W/m-K to about 1.5 W/m-K, in some cases from about 0.1 W/m-K to about 1.2 W/m-K, and in other cases from about 0.5 W/m-K to about 1 W/m-K. The carbon nanotubes can have a diameter from about 0.5 nm to about 20 nm, or from about 1 nm to about 19 nm, or from about 1 nm to about 18 nm and a length from about 0.1 μm to a few mm, or from about 0.2 μm to about 100 μm, or from about 0.2 to about 10 μm. Graphene particles can have a thickness from about 5 nm to about 100 nm, or from about 8 nm to about 90 nm, or from about 10 nm to about 80 nm and a width from about 0.5 μm to about 5 μm, or from about 0.8 μm to about 4 μm, or from about 1 μm to about 3 μm. Polyhedral carbon particles can have at least one dimension from about 10 nm to about 500 nm, or from about 15 nm to about 450 nm, or from about 20 nm to about 400 nm. Polyhedral aluminum oxide particles can have at least one dimension from about 30 nm to about 100 nm, or from about 35 nm to about 80 nm, or from about 40 nm to about 75 nm. Aluminum oxide fibers can have a diameter from about 2 nm to about 10 nm, or from about 1 nm to about 9 nm, or from about 1 nm to about 8 nm and a length from about 1 μm to about 10 μm, or from about 1.2 μm to about 9 μm, or from about 2 to about 8 μm.

In another embodiment, addition of nanoparticles such as, for example, nano-sized copper particles can improve the electrical or thermal conductivity of the hyper nanocomposite 100. The nano-sized copper metal particles can have an average particle diameter of from about 50 to about 1,500 nm, or from about 50 to about 1,000 nm, or from about 50 to about 500 nm, or from about 50 to about 300 nm. In addition, the nano-sized copper metal particles can be in other forms, such as polyhedral or flake form. Copper flakes can have a thickness of from about 5 to about 100 nm, or from about 8 to about 80 nm, and surface length (or width) of from about 0.5 μm to about 5 μm, or from about 0.8 μm to about 4 μm or from about 1 μm to about 3.5 μm. Polyhedral copper particles can have a length from about 5 μm to about 20 μm, or from about 8 μm to about 18 μm, or from about 10 μm to about 15 μm with a thickness from about 50 nm to about 500 nm, or from about 55 nm to about 450 nm, or from about 60 nm to about 350 nm.

In another embodiment, addition of nanoparticles such as, for example, fluoroplastic or fluorinated polyorganosilsesquioxane can improve the surface release property of the hyper nanocomposite 100. In some embodiments, the hyper nanocomposite 100 can have a surface energy in the range of about 13 dyne/cm to about 20 dyne/cm, in some cases from about 13 dyne/cm to about 18 dyne/cm, and in other cases from about 13 dyne/cm to about 15 dyne/cm. The nano-sized fluoroplastic or fluorinated polyorganosilsesquioxane particles can have an average particle diameter of from about 10 to about 1,500 nm, or from about 10 to about 1,000 nm, or from about 10 to about 500 nm, or from about 10 to about 300 nm.

Exemplary nanoparticles, such as, aluminum nitride, aluminum oxide, and silicon dioxide can improve the mechanical properties, such as, tensile strength, toughness, and ultimate strength of the hyper nanocomposite 100. In certain embodiments, the hyper nanocomposite 100 can have a tensile strength in the range of about 800 psi to about 2000 psi, or from about 800 psi to about 1800 psi, or from about 1000 psi to about 1500 psi. In various embodiments, the hyper nanocomposite 100 can have a toughness in the range of about 800 in·lbf/in$^3$ to about 3000 in·lbf/in$^3$, or from about 1000 in·lbf/in$^3$ to about 2200 in·lbf/in$^3$, or in some cases from about 1200 in·lbf/in$^3$ to about 2000 in·lbf/in$^3$. In certain embodiments, the hyper nanocomposite 100 can have a % ultimate strain in the range of about 50% to about 400%, or from about 80% to about 350%, or from about 100% to about 300%. Polyhedral aluminum nitride particles can have at least one dimension from about 10 nm to about 500 nm, or from 20 nm to about 450 nm, or from about 50 nm to about 400 nm. Silicon dioxide nanoparticles can have a diameter from about 1 nm to about 100 nm, or from about 2 nm to about 90 nm, or from about 5 nm to about 80 nm.

In various embodiments, the hyper nanocomposite 100 can further include one or more additives selected from the group consisting of electrically conductive fillers, thermally conductive fillers, thermally stabilizing agents, coloring agents, reinforcing fillers, surfactants, cross-linking agents, leveling agents, and processing aids.

Figure 2:
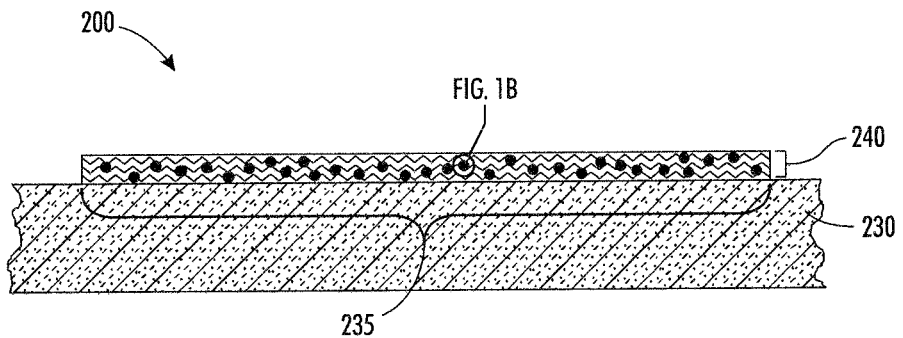
FIG. 2 schematically illustrates a cross sectional view of a portion of an exemplary article in accordance with various embodiments of the present teachings.

FIG. 2 schematically illustrates a cross sectional view of a portion of an exemplary article 200. The exemplary article 200 can include a surface 230, wherein the surface 230 can include at least one region 235 and a hyper nanocomposite coating 240 disposed over the one region 235. In various embodiments, the hyper nanocomposite coating 240, for example, hyper nanocomposite 100' shown in FIG. 1B including a plurality of nanoparticles 120 substantially uniformly dispersed in one or more cross-linked hyperbranched polymers 110' selected from the group consisting of polycarbosilane, polycarbosiloxane, polycarbosilazane, and polyfluorocarbon. The hyper nanocomposite coating 240 can have any suitable thickness. However, in some embodiments, the hydrophobic composite coating 240 can have a thickness from about 1 to about 200, or from 5 to about 100, or from 10 to about 50.

The article 200 can include any suitable material for the surface 230, including, but not limited to, metal, plastic, and fabric. In some embodiments, the surface 230 can be a high temperature plastic substrate, such as, for example, polyimide, polyphenylene sulfide, polyamide imide, polyketone, polyphthalamide, polyetheretherketone (PEEK), polyethersulfone, polyetherimide, and polyaryletherketone. In other embodiments, the surface 230 can be a metal substrate, such as, for example, steel, iron, and aluminum. The surface 230 can have any suitable shape, such as, for example, a film, a belt, a plate, or a roll configuration. In certain embodiments, the article 200 can include an intermediate layer (not shown) disposed between the one region 235 and the hyper nanocomposite coating 240.

The disclosed exemplary hyper nanocomposite 100' and hyper nanocomposite coating 240 can be used for a wide variety of applications, including, but not limited to, functional surfaces for marking subsystems, or media transport systems. In certain embodiments, the exemplary article 200 can include, but is not limited to components of a marking system, such as, for example, bias charge roll, a bias transfer roll, a magnetic roller sleeve, an intermediate transfer belt, a transfer belt, a fuser roll, a fuser belt, a pressure roll, a pressure belt, a transfix roll, a transfix belt, bias charge roll, external heat rolls, and oiling subsystem. In some embodiments, the article 200 can be a xerographic printer. In other embodiments, the article 200 can be a solid inkjet printer.

Figure 3:
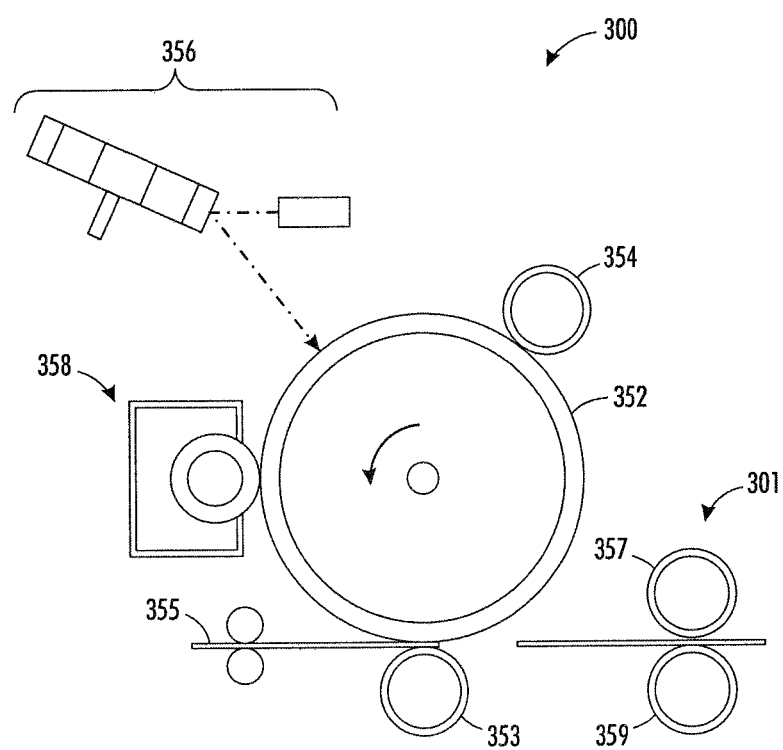
FIG. 3 shows a schematic illustration of an exemplary printing apparatus, according to various embodiments of the present teachings.

FIG. 3 schematically illustrates an exemplary printing apparatus 300. The exemplary printing apparatus 300 can be a xerographic printer and can include an image receiving member, such as an electrophotographic photoreceptor 352 and a charging station 354 for uniformly charging the electrophotographic photoreceptor 352. The electrophotographic photoreceptor 352 can be a drum photoreceptor as shown in FIG. 3 or a belt photoreceptor (not shown). The exemplary printing apparatus 100 can also include an imaging station 356 where an original document (not shown) can be exposed to a light source (also not shown) for forming a latent image on the electrophotographic photoreceptor 352. The exemplary printing apparatus 300 can further include a development subsystem 358 for converting the latent image to a visible image on the electrophotographic photoreceptor 352 and a transfer subsystem 353 for transferring the visible image onto a media 355. The printing apparatus 300 can also include a fuser subsystem 301 for fixing the visible image onto the media 355. The fuser subsystem 301 can include one or more of a fuser member 357, a pressure member 359, oiling subsystems (not shown), and a cleaning web (not shown). In some embodiments, the fuser member 357 can be a fuser roll 357, as shown in FIG. 3. In other embodiments, the fuser member 357 can be a fuser belt 315 (not shown). In various embodiments, the pressure member 359 can be a pressure roll 359, as shown in FIG. 3 or a pressure belt (not shown). In various embodiments, at least one of the charging station 354, the imaging station 356, the development subsystem 358, the transfer subsystem 353, and the fuser subsystem 301 can include a hyper nanocomposite coating disposed over a substrate, for example, exemplary hyper nanocomposite coating 240 shown in FIG. 2, the hyper nanocomposite coating 240 can include a plurality of nanoparticles substantially uniformly dispersed in one or more cross-linked hyperbranched polymers, for example, the hyper nanocomposite 100' as shown in FIG. 1B.

Figure 4:
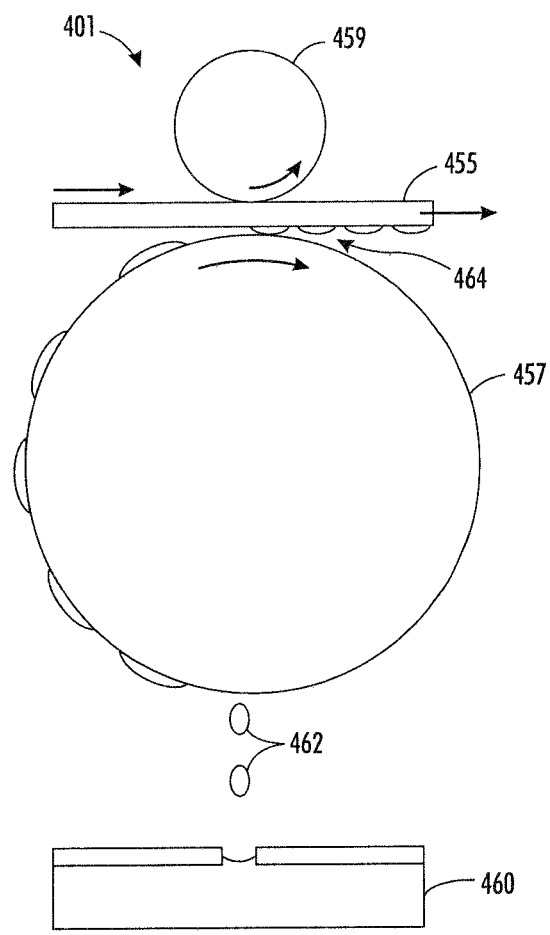
FIG. 4 schematically illustrates an exemplary transfix system of a solid inkjet printing apparatus in accordance with various embodiments of the present teachings.

In certain embodiments, the printing apparatus can be a solid inkjet printer (not shown) including an exemplary transfix system 401 shown in FIG. 4. The exemplary transfix system 401 can include a solid ink reservoir 460. The solid ink can be melted by heating to a temperature of about 150° C. and the melted ink 462 can then be ejected out of the solid ink reservoir 460 onto an image drum 457. In various embodiments, the image drum 457 can be kept at a temperature in the range of about 70° C. to about 130° C. to prevent the ink 462 from solidifying. The image drum 457 can be rotated and the ink can be deposited onto a media 455, which can be fed through a transfixing (transfusing) nip 464 between the image drum 457 and a pressure roll 459. In some embodiments, the pressure roll 459 can be kept at a room temperature. In other embodiments, the pressure roll 459 can be heated to a temperature in the range of about 50° C. to about 100° C. In various embodiments, at least one of the image drum 457 and the pressure roll 459 can include a hyper nanocomposite coating disposed over a substrate, for example, exemplary hyper nanocomposite coating 240 shown in FIG. 2, the hyper nanocomposite coating including a plurality of nanoparticles substantially uniformly dispersed in one or more cross-linked hyperbranched polymers, for example, the hyper nanocomposite 100' as shown in FIG. 1B.

Figure 5:
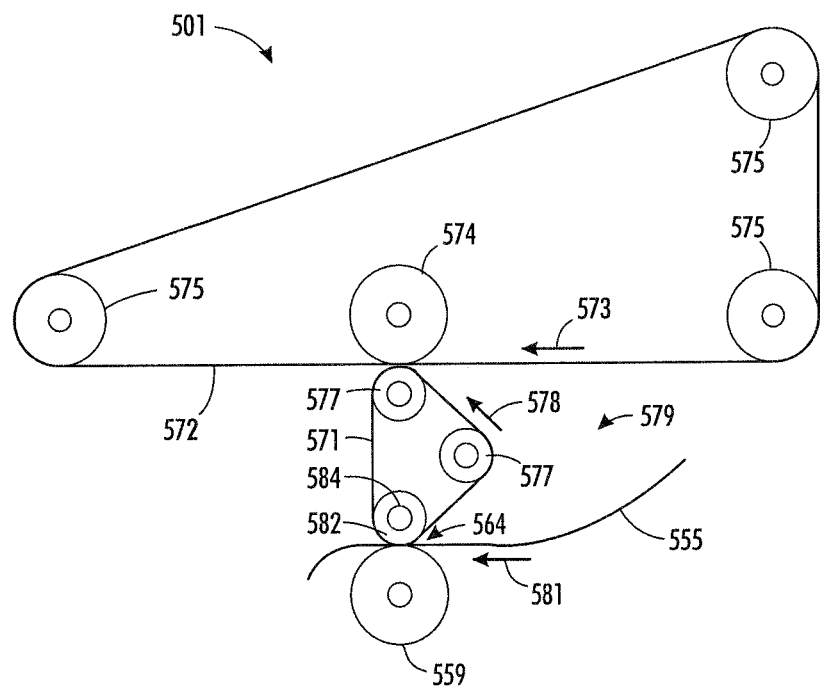
FIG. 5 schematically illustrates exemplary image development subsystem, according to various embodiments of the present teachings.

FIG. 5 illustrates an exemplary image development subsystem 501 in a xerographic transfix configuration, according to various embodiments of the present teachings. In the transfix configuration, the transfer and fusing occur simultaneously. As shown in FIG. 5, a transfer subsystem 579 can include a transfix belt 571 held in position by two driver rollers 577 and a heated roller 582, the heated roller 582 can include a heater element 584. The transfix belt 571 can be driven by driver rollers 577 in the direction of the arrow 578. The developed image from photoreceptor 572, which is driven in a direction 573 by rollers 575, can be transferred to the transfix belt 571 when a contact between the photoreceptor 572 and the transfix belt 571 occurs. The image development subsystem 501 can also include a transfer roller 574 that can aid in the transfer of the developed image from the photoreceptor 572 to the transfix belt 571. In the transfix configuration, a media 555 can pass through a fusing nip 564 formed by the heated roller 582 and the pressure roller 559, and simultaneous transfer and fusing of the developed image to the media 555 can occur. In some cases it may be necessary, optionally, to cool the transfix belt 571 before it re-contacts the photoreceptor 572 by an appropriate mechanism predisposed between the rollers 577. In various embodiments, at least one of the transfix belt 571, the driver rollers 577, the rollers 575, the heated roller 582, the pressure roller 559 can include a hyper nanocomposite coating disposed over a substrate, for example, exemplary hyper nanocomposite coating 240 shown in FIG. 2, wherein the hyper nanocomposite coating can include a plurality of nanoparticles substantially uniformly dispersed in one or more cross-linked hyperbranched polymers, for example, the hyper nanocomposite 100' as shown in FIG. 1B.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of a Marking System Component

About 100 g of hyperbranched polymer (Michigan Molecular Institute, Midland, Mich.) was dissolved in about 500 ml of hexane. About 30 g of nano-aluminum oxide (Alfa-Aesar, Ward Hill, Mass.), about 10 g of silanol-functionalized PDMS (Gelest Inc., Morrisville, Pa.), and about 5 g Carbon nanotubes (Cheap Tubes, Inc., Brattleboro, Vt.) were added to the hyperbranched polymer solution and mixed via standard physical mixing. The resulting formulation was then introduced to a magnetic pumping system and coated onto a fuser roller. The fuser roller with the coating was then cured at about 200° C. for about 16 hours. This fuser roller was then installed in a printing machine.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A hyper nanocomposite comprising:
   a matrix comprising one or more cross-linkable hyperbranched polymers selected from the group consisting of polycarbosilane, polycarbosiloxane, polycarbosilazane, and polyfluorocarbon;
   a plurality of nanoparticles substantially uniformly dispersed in the matrix, wherein the plurality of nanoparticles comprises one or more types of particles selected from the group consisting of graphene, carbon, aluminum oxide, aluminum nitride, silicon dioxide, silicon carbide, silicon nitride, copper, single wall carbon nanotubes and multi-wall carbon nanotubes; and
   a second plurality of nanoparticles selected from the group consisting of fluoroplastic nanoparticles or fluorinated polyorganosilsesquioxane nanoparticles, wherein the second plurality of nanoparticles is in an amount sufficient to provide the hyper nanocomposite with a surface energy in the range of about 13 dyne/cm to about 20 dyne/cm.

2. The hyper nanocomposite of claim 1, wherein each of the plurality of nanoparticles has at least one dimension in the range of about 1 nm to about 500 nm.

3. The hyper nanocomposite of claim 1, wherein each of the plurality of nanoparticles is physically or chemically bonded to the one or more cross-linkable hyperbranched polymers.

4. The hyper nanocomposite of claim 1, wherein the hyper nanocomposite has a thermal conductivity in the range of about 0.1 W/m-K to about 1.5 W/m-K.

5. The hyper nanocomposite of claim 1, wherein the hyper nanocomposite has a tensile strength in the range of about 800 psi to about 2000 psi.

6. The hyper nanocomposite of claim 1, wherein the hyper nanocomposite has a toughness in the range of about 800 in·lbf/in$^3$ to about 3000 in·lbf/in$^3$.

7. The hyper nanocomposite of claim 1, wherein the hyper nanocomposite has a % ultimate strain in the range of about 50% to about 400%.

8. The hyper nanocomposite of claim 1, wherein the nanoparticles are present in an amount ranging from about 0.5% to about 50% by weight of the total solid weight of the hyper nanocomposite composition.

9. The hyper nanocomposite of claim 1 further comprising one or more additives selected from the group consisting of electrically conductive fillers, thermally conductive fillers, thermally stabilizing agents, coloring agents, reinforcing fillers, surfactants, cross-linking agents, leveling agents, and processing aids.

10. The hyper nanocomposite of claim 1, wherein the matrix at least comprises polyfluorocarbon.

11. The hyper nanocomposite of claim 1, wherein the matrix at least comprises polycarbosilazane.

12. The hyper nanocomposite of claim 1, wherein the plurality of nanoparticles comprises one or more types of particles selected from the group consisting of aluminum oxide, aluminum nitride, silicon carbide, silicon nitride, and copper, wherein the nanoparticles do not include carbon nanotubes, graphene nanoparticles and carbon nanoparticles.

13. The hyper nanocomposite of claim 1, wherein the second plurality of nanoparticles is fluorinated polyorganosilsesquioxane nanoparticles.

14. A hyper nanocomposite comprising:
   a matrix comprising one or more cross-linkable hyperbranched polymers selected from the group consisting of polycarbosilane, polycarbosiloxane, polycarbosilazane and polyfluorocarbon, the matrix at least comprising polyfluorocarbon;
   a first plurality of nanoparticles substantially uniformly dispersed in the matrix, wherein the first plurality of nanoparticles is selected from the group consisting of aluminum oxide, aluminum nitride, silicon carbide and silicon nitride; and
   a second plurality of electrically conductive nanoparticles substantially uniformly dispersed in the matrix in an amount sufficient to impart electrical conductivity to the hyper nanocomposite, wherein the second plurality of nanoparticles is selected from the group consisting of copper, single wall carbon nanotubes and multi-wall carbon nanotubes.

15. The hyper nanocomposite of claim 14, wherein the second plurality of nanoparticles further comprises nanoparticles selected from the group consisting of single wall carbon nanotubes and multi-wall carbon nanotubes.

16. The hyper nanocomposite of claim 14, wherein the first plurality of nanoparticles is aluminum oxide nanoparticles.

\* \* \* \* \*